United States Patent [19]

Kao et al.

[11] Patent Number: 5,152,884
[45] Date of Patent: Oct. 6, 1992

[54] ZEOLITES FOR REFORMING CATALYSTS

[75] Inventors: Jar-Lin Kao; Murray Nadler, both of Houston; Mark J. Potter, League City; Roque V. Martir, Baytown, all of Tex.

[73] Assignee: Exxon Chemicals Patents Inc., Linden, N.J.

[21] Appl. No.: 579,914

[22] Filed: Sep. 7, 1990

Related U.S. Application Data

[62] Division of Ser. No. 259,644, Oct. 19, 1988, Pat. No. 4,987,109.

[51] Int. Cl.$^5$ ............................................. C10G 35/06
[52] U.S. Cl. .................................... 208/138; 208/135; 208/134; 208/137
[58] Field of Search .................. 208/137, 138; 502/66

[56] References Cited

U.S. PATENT DOCUMENTS

| | | |
|---|---|---|
| 3,216,789 | 11/1965 | Breck . |
| 3,557,024 | 1/1971 | Young et al. . |
| 3,867,512 | 2/1975 | Young . |
| 4,157,293 | 6/1979 | Plank et al. ............... 208/137 |
| 4,448,891 | 5/1984 | Cohen . |
| 4,544,539 | 10/1985 | Wortel . |
| 4,547,472 | 10/1985 | Van Nordstrand . |
| 4,547,672 | 10/1985 | Arakawa et al. . |
| 4,552,856 | 11/1985 | Tauster et al. . |
| 4,593,133 | 6/1986 | Wortel . |
| 4,595,668 | 6/1986 | Poeppelmeier et al. . |
| 4,648,960 | 3/1987 | Poeppelmeier et al. . |
| 4,795,846 | 1/1989 | Zmich et al. ............... 208/137 |
| 4,888,105 | 12/1989 | Huss Jr. et al. ............ 208/137 |

*Primary Examiner*—Helane Myers
*Attorney, Agent, or Firm*—Edward F. Sherer

[57] ABSTRACT

Zeolites washed with aqueous solutions or water to exhibit pH in the range of 9.4 to 10.0 and preferably 9.6 to 10.0 which can be converted to reforming catalysts with enhanced activity, selectivity and activity maintenance. Also processes for washing the zeolite to the target pH range and processes for using catalysts made with the washed zeolite to reform naphtha feeds.

14 Claims, 1 Drawing Sheet

ZEOLITES FOR REFORMING CATALYSTS

This is a division of application Ser. No. 259,644, filed Oct. 19, 1988, now U.S. Pat. No. 4,987,109.

BACKGROUND OF THE INVENTION

1. Field of the Invention

The present invention is directed to zeolite crystals, and preferably crystals of large pore zeolites, such as zeolite L, which have been washed to a pH within the range of about 9.4–10.0, to processes for accomplishing the desired zeolite washing, to catalytic reforming catalysts based on washed zeolite crystals, and catalytic reforming processes which utilize catalysts based on washed zeolite. Catalytic reforming catalysts made from zeolite washed into the desired 9.4 to 10.0 pH range exhibit activity, selectivity and activity maintenance which are significantly higher than catalysts using zeolites not washed.

2. Discussion of Background and Material Information

Catalytic reforming is a major petroleum refining process used to raise the octane rating of naphthas (C6 to C11 hydrocarbons) for gasoline blending. Catalytic reforming is also a principle source of aromatic chemicals (benzene, toluene, and xylenes) via conversion of paraffins and naphthenes to aromatics. The principle chemical reactions which occur during catalytic reforming include dehydrogenation of cyclohexanes to aromatics, dehydrocyclization of paraffins to aromatics, dehydroisomerization of alkylcyclopentanes to aromatics, isomerization of normal paraffins to branched paraffins, dealkylation of alkylbenzenes and hydrocracking of paraffins to light hydrocarbons, i.e., methane, ethane, propane, and butane. The latter reaction is undesirable and should be minimized since it produces light hydrocarbons not suitable for gasoline blending which have less value than gasoline fractions.

Reforming is carried out at temperatures of 800° F. to 1000° F., pressures of 50 to 300 psi, weight hourly space velocities of 0.5 to 3.0 and in the presence of hydrogen at hydrogen to hydrocarbon molar ratios of 1 to 10.

Reforming catalysts currently widely used in commercial reformers are platinum on an alumina substrate, and platinum plus a second promoting metal such as rhenium or iridium on alumina. These catalysts are bifunctional, i.e., the dehydrogenation reactions required in the reforming process are accomplished on the catalystic metal in the catalysts and the isomerization and cyclization reactions also required in reforming are accomplished on strong acid sites on the alumina catalyst support. Undesirable hydrocracking reactions which break C6+ paraffins down to lower molecular weight hydrocarbons and reduce selectivity to aromatics occur on the strong acid catalytic sites.

Alumina based reforming catalysts demonstrate reasonably high selectivities for converting C8+ paraffins and naphthenes to aromatics but are less satisfactory for aromatizing $C_6$ to $C_8$ paraffins; they hydrocrack more of the lower paraffins to low value fuel gas than they convert to aromatics.

New reforming catalysts are being developed which are significantly more active and selective for aromatizing $C_6$ to $C_8$ paraffins than alumina based catalysts. These new catalysts are zeolite based rather than alumina based. Zeolite based reforming catalysts are facile for aromatizing lower paraffins because they are monofunctional, i.e., they accomplish the isomerization reactions with great facility on the same catalystic metal active sites as the dehydrogenation and cyclization reactions. They do not require not contain strong acid sites which promote hydrogenolysis cracking reactions to accomplish isomerization. Moreover, certain zeolites have micropore dimension and configurations which sterically promote the desirable isomerization and dehydrocyclization reactions for $C_6$ to $C_8$ paraffins and repress undesirable hydrogenolysis cracking reactions. Accordingly, $C_6$ to $C_8$ paraffin selectivity to aromatics is high for these sterically favored zeolite catalysts. Zeolite which perform best as reforming catalysts substrates fall into the so-called "large pore" category which have pore diameters of 6 angstrom units or higher. The large pore zeolite L is a particularly good reforming catalysts substrate.

U.S. Pat. No. 4,448,891, COHEN, is directed to an improved reforming catalyst employing a zeolite L support provided by soaking the zeolite L in an alkali solution having a pH of at least 11 for a time and temperature effective to increase the period of time over which the catalytic activity of the catalyst is maintained, wherein the procedure involves washing the alkali soaked zeolite with water followed by repeated soakings in the zeolite solution for additional 18-hour periods with washing repeatedly thereafter until the pH of the zeolite water wash was at or below 10.5, followed by drying at 100° C.

U.S. Pat. No. 4,544,539, and 4,593,133, WORTEL, are directed to zeolite related to zeolite L having certain characteristics wherein the process for preparation subsequent to separating the zeolite by centrifuging, involves washing four times with cold water prior to drying at 150° C. In one procedure, disclosed in WORTEL '539, zeolite crystals were washed 5–6 times with cold water and the washings were decanted by centrifuging prior to drying in air for 16 hours at 150° C.

U.S. Pat. No. 3,216,789, BRECK, relates to a process for producing synthetic zeolite which involves washing zeolite crystals, after the reactant mother liquor is filtered off, preferably with diluted water, until the effluent wash water, in equilibrium with the product, has a pH of between 9 and 12. This patent also discloses that as the zeolite crystals are washed, the exchangeable cation of the zeolite may be partially removed and is believed to be replaced by hydrogen cations. If the washing is discontinued when the pH of the effluent wash water is between about 10 and 11, the $(K_2O + Na_2))/Al_2O_3$ molar ratio of the crystalline product is disclosed as being approximately 1.0 but that excessive washing will result in a somewhat lower value for this ratio, while insufficient washing will leave a slight excess of exchangeable cations associated with the product.

SUMMARY OF THE INVENTION

The present invention is directed primarily to processes which involve washing zeolite with a washing liquid, such as an aqueous solution or water, and preferably deionized water, to produce zeolite crystals having a pH in the pH range of 9.4 to 10.0, and preferably within the pH range of 9.6 to 9.8, and to zeolite crystals washed to within the desired pH range.

Typically, washed zeolites, as recovered from the mother liquor in which they are crystallized, have a pH of about 12.5 so that they must be washed with water or neutral pH water solutions to achieve the target 9.6 to 10.0 pH range.

The preferred washing processes include slurrying the zeolite crystals with water or appropriate wash solution and separating the crystals from the water in an appropriate filter, such as a pressure leaf filter, filter press or centrifuge. Then additional wash fluid is pumped into the filter and through the deposited zeolite filter cake until the target pH range is achieved. The wash water can be pumped once through the zeolite filter cake and discarded.

Alternatively, a batch of wash water can be circulated through the filter cake until steady state equilibrium is achieved between the recirculating batch of wash water and the zeolite filter cake, following which the batch of wash water is discarded. If the resulting zeolite pH is too high the process is repeated with a fresh batch of wash water.

With all washing processes care must be taken that the batch of zeolite crystals is washed uniformly to avoid variability in the resulting catalyst. This usually requires that the cake of zeolite be deposited uniformly across the filter surface and that all sections of the filter surface have equal access to wash fluid flow.

Another suitable washing process includes dislodging the zeolite filter cake into a vessel equipped with an agitator containing a charge of wash fluid and slurrying the zeolite into the wash fluid. The zeolite is washed until equilibrium is established between the wash fluid and the zeolite and then the zeolite is filtered out of the wash fluid. This process is repeated until the zeolite pH falls into the target range.

The present invention also relates to reforming catalysts produced from the properly washed zeolite by forming the washed zeolite into aggregates using a suitable binder material such as alumina, silica, aluminosilicates, kaoline, and clays and incorporating appropriate catalytically active metals, such as platinum, rhenium and iridium into the catalyst by impregnation or ion exchange.

The present invention also relates to reforming processes which utilize the catalysts produced form the appropriately washed zeolites. One widely practiced commercial reforming process utilizes a train of three or four adiabatic packed bed reactors connected in series. The naphtha feed is vaporized and heated to 800° F. to 1000° F., mixed with hydrogen and fed into the inlet of the lead reactor. Reforming reactions are net endothermic so the temperature of the effluent from the reactors is typically below or in the lower end of the 800° to 1000° F. reforming temperature range. Accordingly, reactor effluent streams are reheated in furnaces installed upstream of each of the reactors. The reactor product from the tail reactor is cooled and flashed to low pressure in a flash drum and separated into a gas stream rich in hydrogen and into a liquid reformate product stream rich in aromatics. Part of the hydrogen stream from the flash drum is recycled into the feed stream entering the lead reactor to provide the hydrogen required to achieve the hydrogen to oil ratio specified for the process. Reforming is a net hydrogen producing process so the balance of the flash drum overhead stream which contains the hydrogen produced from the reforming reactions is sent off typically to a hydrogen purification unit to recover the hydrogen make.

BRIEF DESCRIPTION OF THE DRAWINGS

This invention will be better understood and its advantages will become more apparent from the following detailed description, especially when read in light of the attached drawing wherein the single figure is a graph showing the effect of zeolite pH on benzene yield as measured by a catalyst activity test, as defined herein.

DETAILED DESCRIPTION OF THE INVENTION

Figure 1:
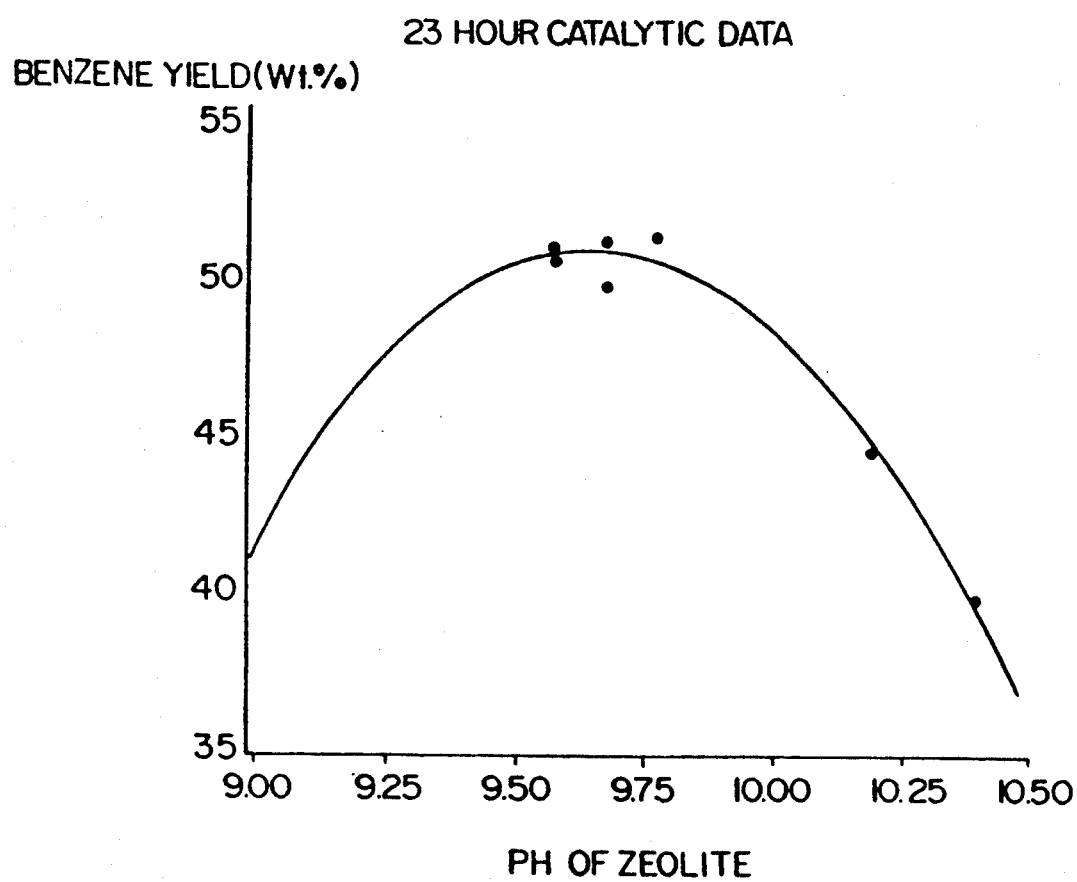

A primary objective of the present invention, therefore, is to produce a zeolite reforming catalyst having superior activity, selectively and activity maintenance. While the invention applies to any zeolite which is a suitable substrate for reforming catalysts, the discussion herein is directed to large pore zeolites and specifically zeolite L which we have determined yields a particularly advantageous reforming catalyst. A complete description of zeolite L is provided in U.S. Pat. No. 3,216,789 and procedures for making zeolite L are described in U.S. Pat. Nos. 3,216,789 and 3,867,512, the disclosures of which are hereby incorporated in their entirety by reference thereto. We have discovered that reforming catalysts made using zeolites which have been washed with aqueous solutions or water such that the zeolite after washing exhibits a pH in the pH range of 9.4 to 10.0, and preferably 9.6 to 9.8, can be converted to reforming catalysts which exhibit superior performance.

For purposes of the present invention, the pH of the zeolite crystals is determined using the following procedure: a mixture of 10 grams of zeolite and 100 grams of deionized water is stirred at room temperature for about five minutes and then centrifuged. The pH of the zeolite, as used herein, is the pH of the supernatent liquid determined using a standard pH meter calibrated with pH 7 and 10 buffer solutions.

The advantage of washing the zeolite to achieve the target zeolite pH is shown in the attached FIGURE in which reforming catalyst performance as measured by a standard catalyst activity test is plotted against the pH of zeolite L used to make the catalyst. Catalysts made with zeolite washed to a pH, as defined above, with the pH range of 9.4 to 10.0, and preferably in the 9.6 to 9.8 pH range, exhibit superior reforming catalytic activity.

Although not wishing to be bound by any particular theory it is believed that at pH greater than 10 the zeolite is underwashed such that too much amorphous silicate and aluminate residue from crystallization remain in the zeolite. These detrimental residues block access to the zeolite microchannels in which the reforming reactions occur interfering with the reactions. At pH below 9.4 the zeolite has ben overwashed such that an excessive fraction of exchangeable potassium ions in the zeolite are replaced by hydrogen ions from the wash water. This introduces undesirable excess acidity which in turn induces hydrogenolysis cracking of feed when the zeolite is converted to a catalyst and used in a reforming process.

Accordingly, to produce reforming catalysts with optimal activity, selectivity and activity maintenance it is necessary to control the pH of zeolite crystals used to make the catalyst to the pH range of 7.4 to 10.0, and preferably 9.6 to 9.8.

This is accomplished by passing an aqueous washing fluid over the zeolite crystals until the desired pH is achieved. The washing liquid may be made preferably with deionized water to insure that no contaminants are added by the zeolite which could impair performance of catalysts produced with its zeolite.

Alternatively, the washing fluid could contain salts or bases of the principle exchangeable cations in the zeolite to reduce ion exchange replacement of zeolite cations with hydrogen in the wash water.

In accordance with the present invention, therefore, uniform washing of zeolite crystals with liquid is accomplished by first depositing the zeolite crystals on a barrier surface preferably in a substantially uniform layer. In general, any barrier surface on which the zeolite crystals will be retained while permitting the passage of the washing liquid therethrough is suitable for purposes of the present invention. Thus, the process of the present invention can be performed using any conventional filter or thickener apparatus suitable for this purpose. In this regard, suitable results have been achieved in accordance with the present invention using a pressure leaf filter, such as a Funda filter. A multi-plate thickener, such as a continuous thickener commercially available from T. Schriver Co. or a plate and frame filter press may also be employed. In any case, however, the barrier surfaces, such as filter cloths or screens, are preferably made of stainless steel or polypropylene material, although the only requirement for purposes of the present invention is that the material must be able to withstand a high pH of about 10.0.

Although there are several suitable processes to wash zeolite crystals in accordance with the present invention, the preferred process is one wherein the zeolite crystals are separated from the mother liquor using a pressure leaf filter, i.e. a Funda filter, and then pumping freshly supplied aqueous liquid, such as deionized water, through the zeolite filter cake until the pH of the zeolite reaches the prescribed pH range as described in more detail herein. Typically, about 4 gallons of wash water per pound of zeolite are pumped through the filter to reduce the pH to the target range. In this embodiment it is particularly important to insure that the zeolite crystals are uniformly deposited across the filter surface to avoid maldistribution of wash water flow through the zeolite crystals so that all segments of the batch are washed uniformly.

For this purpose it is preferred to precoat the filter screen with a filter aid to promote uniform laydown of zeolite on the screen and reduce loss of smaller zeolite crystals. It is preferred to precoat the barrier surface with an inert material having substantially the same composition as the inorganic binder material ultimately used in producing the catalyst containing the washed zeolite powder. Therefore, it is preferable to select a material from the group of alumina, silica, alumina-silica, kaolin, or other clay depending upon which of these materials will be ultimately used in the manufacture of the catalysts.

Although the zeolite material useful for the purposes of the present invention may be selected from the group consisting of large-pore zeolites, type L zeolite are preferred. Representative examples of preparing type L zeolite suitable for purposes of the present invention are described in U.S. Pat. Nos. 3,216,789 and 3,867,512 in addition to U.K. Application No. 82-14147, the disclosures of which are incorporated herein by reference.

As previously mentioned, type L zeolite is preferred catalyst, support or base materials for purposes of the present invention. As used herein, the term "zeolite" refers to a group of naturally occurring, hydrated, metal aluminosilicates, which are crystalline in structure in addition to synthetic zeolite having a composition similar to certain of the natural crystalline zeolites. For purposes of the present invention, the term "zeolite L" and "type L zeolite" are used interchangeably and refer to synthetic zeolite. By way of further explanation, type L zeolites are synthetic zeolites which crystallize in the hexagonal system with a characteristic X-ray diffraction spectrum, i.e. a characteristic X-ray diffraction pattern obtained from CuK alpha radiation with the major d(angstrom) peak values set out in Table A.

TABLE A

| | | |
|---|---|---|
| 16.10 ± 0.3 | 3.91 ± 0.02 | 2.91 ± 0.01 |
| 7.52 ± 0.04 | 3.47 ± 0.02 | 2.65 ± 0.01 |
| 6.00 ± 0.04 | 3.28 ± 0.02 | 2.46 ± 0.01 |
| 4.57 ± 0.04 | 3.17 ± 0.01 | 2.42 ± 0.01 |
| 4.35 ± 0.04 | 3.07 ± 0.01 | 2.19 ± 0.01 |

A theoretical formula is $M_{9/n}[(AlO_2)_9(SiO_2)_{27}]$. The real formula, however, may vary by, for example, the ratio of silicon to aluminum varying from 2.5 to 3.5. A general formula for zeolite L may be represented as follows:

$$0.9-1.3 M_2O:Al_2O_3:xSiO_2:yH_2O$$

wherein  "M" designates at least one exchangeable cation; "n" represents the valence of "M"; and "y" may be any value from 0 to about 9, and "x" is any value between 5.01 and 7.0 and preferably between 5.2 and 6.9.

Thus, type L zeolites with $SiO_2/Al_2O_3$ ratios less than 5.2 or greater than 6.9 are applicable to this invention. Preferably, the $SiO_2/Al_2O_3$ ratio may vary between about 2 and about 50. For example, one method of reducing the $SiO_2/Al_2O_3$ ratio involves leaching some of the $SiO_2$ with an akali metal hydroxide, e.g., KOH, to produce type L zeolite useful in this invention. Physically, zeolite-L has channel-shaped pores undulating from about 7 to 13 angstrom in diameter and may occur in the form of cylindrical crystals with a mean diameter of at least 0.5 micron and an aspect ratio of at least 0.5. The above notwithstanding, minor variations in the mole ratios of the oxides within the ranges indicated by the above formulas do not significantly change the crystal structure or physical properties of the zeolite.

As previously discussed, zeolite L can only be synthesized in the potassium form, i.e., in a form in which exchangeable cations present are substantially all potassium ions. But the cations are exchangeable so that zeolites may be formulated to contain a number of cations such as mono-, di- and trivalent metal ions, particularly those of Groups I, II and III of the Periodic Table including barium, calcium, cesium. lithium, magnesium, potassium, sodium, strontium and zinc ions and the like in addition to other cations, for example, hydrogen and ammonium ions. For example, a type L zeolite in potassium form can be ion exchanged by treatment with an aqueous solution containing a rubidium and/or cesium salt, after which the zeolite is washed to eliminate excess ions. The percent of ions exchanged can be increased by repeating the ion exchange treatment of the zeolite.

Inasmuch as crystallized, zeolite particles are extremely fine in size, typically about one micron, they are difficult to contain in a fixed bed reactor and would induce extremely high pressure drops. The zeolite crystals, therefore, are preferably formed into aggregates, such as extrudates, tablets, pills or spherical forms, typically, in the 1/32 to ¼ inch size range, to be suitable for use in commercial fixed bed reactors. In this regard, inorganic binder such as alumina, silica, kaolin or an alumina-silicate is required to hold the aggregate together and provide crush strength and attrition resistance. Methods for forming zeolite L aggregates are disclosed in U.S. Pat. Nos. 4,595,668 and 4,648,960.

To complete the production of the zeolite based reforming catalyst one or more catalytically active metals must be dispersed into the zeolite. These metals are typically Group VIII metals which include platinum, rhenium and iridium. Other metals can be added to promote the activity and stability of the catalyst. These include tin, iron, germanium and tungsten. Platinum can be introduced by impregnating either the zeolite crystals prior to forming the aggregates or the aggregate zeolite particles with an aqueous solution of a platinum salt or complex such as chloroplatinous acid, hexachloroplatinic acid, dinitrodiaminoplatinum or platinum tetraamine dichloride. Alternatively, platinum can be introduced by ion exchange with potassium ions in zeolite L using a salt such as platinum tetraamine dichloride. Similar compounds can e used to introduce other metals such as rhenium and iridium into the zeolite catalyst. We have determined that superior catalysts are obtained when at least 90% of the metals added to the catalyst prior to reduction are less than 7 angstrom units in size.

Conventional techniques used to manufacture catalysts are disclosed in U.S. Pat. Nos. 4,595,668 and 4,648,960, the disclosure of which is hereby incorporated by reference thereto. Catalysts of platinum-potassium type L-zeolite have been disclosed in U.S. Pat. No. 4,552,856, TAUSTER et al., the disclosure of which is hereby incorporated by reference thereto herein. U.S. Pat. No. 3,557,024 YOUNG et al., disclose alumina bound catalysts having a composition formed by mixing one of a number of zeolites, including zeolite-L, with a binder of hydrous boehmitic alumina, the disclosure which is hereby incorporated by reference thereto.

The following discussion is an elaboration of the invention applied to potassium zeolite L. However the inventive concepts apply equally to other zeolites.

The washing process begins after the zeolite crystallization is complete. Zeolite l is crystallized out of a gel containing potassium hydroxide, silica, alumina and water. (Potassium is required in the gel because zeolite L crystallizes only in the potassium form, e.g., the exchangeable cations in the zeolite are potassium.) The residual zeolite and crystallization mother liquor are basic, typically in the 12 to 13 pH range. The mother liquor is drained out of the crystallizer and the zeolite is reslurried in water, preferably deionized water. The zeolite slurry is pumped into a filter in which the zeolite is deposited on a filter screen. Appropriate filters include pressure leaf filters such as the Funda filter, plate and frame filter presses and centrifuges. Stainless steel and polypropylene filter screens can be employed with good effect but other materials can also be used. Whichever filtration system is used it is important to lay down the zeolite filter cake uniformly across the filter surface to insure that all elements of the filter cake are thoroughly washed.

A preferred washing mode is to pump fresh water into the filter and through the zeolite filter cake through the filter screen until the zeolite exhibits a pH in the target 9.4 to 10.0 range. Typically, about 4 gallons of wash water per pound of zeolite have to be pumped through the filter to reduce the pH to target range.

Although the wash liquid or fluid we prefer to use is simply water, and preferably deionized water to insure that no contaminants are added which could interfere with the performance of catalysts made subsequently with the zeolite, we have also successfully used aqueous water solutions, such as potassium solutions. Of course the pH of these solutions must be below the 9.6 to 10.0 target pH to reduce the pH into the target range. The rationale for using potassium solutions rather than water to wash the zeolite is to repress exchange of hydrogen ions for potassium ions in the zeolite L which we believe is deleterious to catalyst performance.

The preferred washing process is simply to pump wash water through the zeolite until the zeolite pH falls into the target range, however, other washing modes have been successfully tested. One such mode is to recirculate a charge of wash water, typically one gallon of wash water per pound of zeolite, around through the filter several times to achieve equilibrium between the zeolite and the wash water. This operation is repeated until the zeolite pH falls into the target range; typically three or four charges of water are required. Another operating mode is to recirculate a charge of wash water through the filter and continually replace part of the recirculating water stream with fresh water. Still another washing process is to dislodge the filter cake into a charge of wash water in a vessel equipped with an agitator. The zeolite batch is slurried and washed in the water for a period of time and then separated from the wash water in the filter. This operation is repeated until the zeolite pH falls into the target range.

We prefer to precoat the filter screen with a filter aid to promote uniform laydown of zeolite on the screen and reduce loss of smaller zeolite crystals. The preferred filter aid is the binder which will be used subsequently to form the zeolite crystals into an aggregate suitable for use in commercial fixed bed reactors. Suitable binders include alumina, silica, kaolin, and alumina-silicates.

As previously discussed, zeolite L is synthesized in the potassium form. Although potassium zeolite L is an excellent substrate for reforming catalysts, good reforming catalysts can also be produced using zeolite L in which some potassium ions are exchanged for other cations. Suitable cations for zeolite L reforming catalyst substrates include barium, calcium, cerium, lithium, magnesium, sodium, strontium, and zinc. If it is desired to introduce an additional cation into the zeolite, a salt of that cation could be added to the wash solution and the ion exchange accomplished simultaneously with washing. Alternatively, another convenient point in the processing sequence to accomplish the ion exchange is immediately after the zeolite L is washed to target pH.

EXAMPLE I

Illustrating Advantage of Washing Zeolite to Target 9.4 to 10.0 pH range

An accelerated 24 hour activity test has been developed which accurately rates the activity of zeolite reforming catalysts on a relative basis. The activity test is conducted at 950° F. at space velocity of 8.0 w/w/hour based on zeolite in the catalyst and 4.25 molar hydrogen to fee ration. The feed is 40% normal hexane and 60% methylpentanes by weight. The catalyst performance index is simply the weight percent benzene yield on feed after 23 hours at test conditions.

The previously described activity test was employed to demonstrate the advantage of the zeolite was procedure of this invention by comparing the performance of a series of reforming catalysts which are identical in all respects except that the zeolites in the different catalysts were washed to different pH's as determined by the procedure previously described.

The relevant data as presented in Table 1 as follows:

TABLE 1

REFORMING CATALYST PERFORMANCE VERSUS ZEOLITE pH

| Zeolite pH | Benzene Yield at Hrs, Wt % | Comments |
| --- | --- | --- |
| 9.9 | 49.6 | Slightly Under-Washed Product |
| 10.2 | 44.3 | Under-Washed Product |
| 9.8 | 51.3 | Properly Washed Product |
| 9.7 | 51.1 | Properly Washed Product |
| 9.7 | 49.6 | Properly Washed Product |
| 9.6 | 50.9 | Properly Washed Product |
| 9.8 | 51.2 | Properly Washed Product |
| 9.6 | 50.5 | Properly Washed Product |
| 9.6 | 50.9 | Properly Washed Product |
| 9.0 | 41.0 | Over-Washed Product |
| 10.4 | 39.6 | Under-Washed Product |

The catalysts for these runs were prepared using the following procedure: Thirty gram lots of washed potassium zeolite L powder were dried under vacuum at 150° C. for 16 hours yielding 21.6 grams of dried zeolite L crystals. Into this powder 14.256 grams of an aqueous solution containing 0.1647 grams of $Pt(NH_3)_4Cl_2$-$H_2O$ (Pt assay 55.4 wt. %) and 14.0913 grams of water was added. The resultant mixture was converted into a uniform paste which was allowed to stand at room temperature for about 30 minutes and then dried at 110° C. for four hours. The dried paste was then formed into a pellet and then broken and sieved to recover particles in the 20 to 45 mesh size range. The catalyst particles were dried at 480° C. in air for three hours and then treated under hydrogen at 510° C. for one hour to reduce the platinum to the zero valent metal state just prior to initiating the accelerated activity test.

Catalyst made with zeolite washed to within the desirable pH range of 9.4 to 10.0 exhibited activities of 50 wt. % benzene. In contrast, underwashed zeolite, exhibiting a pH above the target pH range at 10.4, converted to catalyst which demonstrated only 40 wt. % benzene yield in the standard activity test. Overwashed zeolite, exhibiting a pH below the target pH range at 9.0, converted to catalyst which demonstrated only b 41 wt. % benzene yield in the standard activity test. The advantage of washing the zeolite to the specified 9.4 to 10.0 pH range is clearly indicated.

EXAMPLE II

Illustrating How a Batch of Zeolite was Washed to 9.5 to 10.0 pH Range

A slurry containing 10 to 20 wt. % of zeolite L was produced by draining crystallization mother liquor from a recently synthesized batch of the zeolite and then mixing the resulting cake into deionized water. The zeolite was separated from the water in a Funda filter. The zeolite L was synthesized in accordance with the procedure set forth in Example 1 of U.S. Pat. No. 4,544,539. The Funda filter is a commercial horizontal plate filter containing 43 circular filter plates mounted in a vertical stack on a central shaft in a cylindrical pressure vessel. The central shaft/filter plate assembly can be spun to dislodge the filter cake. The filter vessel volume is 1000 gallons and the filter screen surface area is 900 square feet. The filter screen material used in this example was polypropylene.

The zeolite slurry was pumped into the Funda filter until the filter was nearly full. The initial pH of the zeolite L as it was pumped into the filter was 12.5. About 1500 lbs. of zeolite (dry basis) was contained in the slurry charged to the filter. The zeolite was deposited uniformly on the filter screen plates by forcing water in the slurry through the filter screen and out of the filter via a conduit in the shaft of the filter press by raising the air pressure above the slurry. The Funda filter was then filled with deionized water. Next a flow of fresh deionized water heated to 150° F. was initiated into the filter at a rate of 20 gallons per minute. The water flowed through the zeolite cake, through the filter screens and out of the filter via the shaft conduit to sewage. After total of 4783 gallons of deionized water was pumped through the filter, the flow of wash water was stopped. Water in the Funda filter was pressured through the zeolite filter cake and out of the filter using air pressure and the wash water heel remaining in the bottom of the filter was drained to sewage.

Samples of washed zeolite were taken from several of the filter plates and were removed from the filter through manholes in the side of the filter vessel. The pH of these zeolite samples were determined by the method described previously and all the samples were in the 9.6 to 10.0 target pH range. The filter cake was dried to about 30 wt. % water content by passing air at 150° F. through the filter over the zeolite for eight hours. The cake was then dislodged from the filter screen by spinning the filter central shaft assembly and dumping the zeolite out through a port in the bottom of the filter.

EXAMPLE III

Illustrating How Washed Zeolite was Converted Into a Reforming Catalyst

The zeolite powder was formed into 1/32 inch extrudate using the following procedure: for each 100 lbs. of zeolite, 10 lbs. of bohemite alumina was mixed with 105 lbs. of acidic alumina water sol containing 20% alumina in a Muller type mixer. The zeolite was added to the mixer and kneaded into a paste. The paste was heated in the mixer until its water content was reduced to 32 wt. %. The paste was then extruded into 1/32 inch diameter extrudate using a four inch conventional single screw extruder and the resulting extrudate broken into particles in the range of 1/32 to ¼ inch in length. The extrudate was dried at 150° C. and calcined at 500° C.

Platinum was loaded into the extrudate using the following procedure: a solution having the composition 2.4321 grams $Pt(NH_3)_4Cl_2.H_2O$, 1.822 grams KCl, 1.2 grams KOH and 354.55 grams $H_2O$ was circulated for 30 minutes at 20° C. over 200 grams of the zeolite extrudate. The loading solution was drained from the extrudate and the wet extrudate was maintained at 50° C. for 20 hours. The extrudate was dried at 110° for four hours and calcined in air at 350° C.

EXAMPLE IV

Illustrating Performance of Reforming Catalyst Made Using Zeolite Washed to Target 9.4 to 10.0 pH Range The catalyst made using the preceding procedure was charged into a pilot plane reforming reactor system which included four one inch i.d. reactors piped in series and operated so as to closely simulate a commercial reforming unit.

TABLE IV

| Run Data | | | | |
|---|---|---|---|---|
| Reactor inlet T, °F. | 950 | 968 | 968 | 968 |
| Reactor outlet T, °F. | 869 | 876 | 880 | 919 |

| Feed composition: | |
|---|---|
| Component | wt % |
| $C_5$ | 0.14 |
| $NC_5$ | 0.43 |
| CP | 0.0 |
| 22 DMB | 0.96 |
| 23 DMB | 3.47 |
| 2MP | 19.22 |
| 3MP | 21.80 |
| $NC_6$ | 34.94 |
| $C_6^-$ | 0.03 |
| MCP | 4.86 |
| CH | 0.43 |
| Bz | 0.02 |
| $IC_7$ | 13.16 |
| $NC_7$ | 0.34 |
| $C_7^-$ | 0.00 |
| DMCP | 0.18 |
| MCH | 0.01 |
| TOL | 0.00 |
| $C_8^+$ | 0.01 |
| Total | 100.0 |
| $C_5^{-+}$ | 5.00 |
| DMB: | |
| $C_6$'s: | 81.30 |
| $C_7$'s: | 13.70 |
| Total S: | <10 ppb |

| Operating Conditions | |
|---|---|
| Space Velocity | 2.0 WHSV-1.56 WHSV |
| Hydrogen/Oil Ratio | 4.5 $H_2$/oil molar |
| Hydrogen Partial Pressure | 98 psia |

Total catalyst weight 300 g distributed as follows:

| Reactor | Cat. Dist. Wt. |
|---|---|
| 1 | 14 |
| 2 | 18 |
| 3 | 34 |
| 4 | 34 |

| Product Yield At 300 hours into run on oil: | |
|---|---|
| $C_6$ plus conversion | 73.9 wt % on feed |
| Aromatic yield | 41.8 wt % on feed |
| Selectivity to aromatics | 58.3 wt % on feed |

As in the above data shows, the catalyst made using zeolite washed to the specified 9.6 to 10.0 pH range as specified in this invention performed admirably in the reforming test. In particular, the high selectivity and yield achieved converting C6's and C7's to aromatics are very impressive.

Although the invention has been described with reference to particular means, materials, embodiments, and examples, from the foregoing description, one skilled in the art can easily ascertain the essential characteristics of the present invention, and various changes and modifications may be made to adapt to various usages and conditions, without departing from the spirit and scope of the invention as described in the claims that follow.

What is claimed is:

1. A reforming process for a hydrocarbon feedstock comprising:
   contacting said hydrocarbon feedstock at reforming conditions with a catalyst comprising zeolite containing exchangeable cations loaded with at least one catalytically active metal selected from the group consisting of Group VIII metals of the Period Table of Elements, tin and germanium, said zeolite having a pH of 9.4 to 10.0 determined by measuring pH of supernatant liquid from a mixture of one part of zeolite crystals with ten parts of deionized water by weight, and said zeolite being present in an amount effective to enhance the activity, selectivity and activity maintenance of the catalyst, so as to increase aromatics content and octane rating of said hydrocarbon feedstock.

2. The reforming process in accordance with claim 2 wherein said pH is within the range of 9.6 to 9.8.

3. The process in accordance with claim 1, wherein said exchangeable metal cations selected from the group consisting of potassium, sodium strontium, barium, calcium, lithium, magnesium, rubidium, and cesium.

4. The reforming process in accordance with claim 1, wherein said zeolite is a large-pore zeolite.

5. The reforming process as defined by claim 4, wherein said large-pore zeolite is zeolite L.

6. The reforming process as defined by claim 5, wherein said cation is potassium.

7. The reforming process as defined by claim 1, wherein said catalytically active metal is a Group VIII noble metal.

8. The reforming process as defined by claim 7, wherein said Group VIII noble metal is Pt.

9. The reforming process as defined by claim 7, wherein said Group VIII noble metal comprises particles having a mean apparent diameter of no more than about 7 Angstroms.

10. The reforming process as defined by claim 4, wherein said catalyst further comprises a co-catalyst selected from the group consisting of Re, Ir, W, Sn, and Fe.

11. The reforming process as defined by claim 10, wherein said co-catalyst is selected from the group consisting of Re and Ir.

12. The reforming process as defined by claim 4, wherein said catalyst further comprises an inorganic binder selected from the group consisting of silica, alumina, silica-alumina, and kaolin.

13. The reforming process as defined by claim 12, wherein said catalyst is an aggregate.

14. The reforming process as defined by claim 13, wherein said aggregate is selected from the group consisting of extrudates, tablets, pellets and prills.

* * * * *